United States Patent
Nagasamy et al.

(10) Patent No.: US 11,270,164 B1
(45) Date of Patent: Mar. 8, 2022

(54) VEHICLE NEURAL NETWORK

(71) Applicant: Ford Global Technologies, LLC, Dearborn, MI (US)

(72) Inventors: Vijay Nagasamy, Fremont, CA (US); Deepti Mahajan, Mountain View, CA (US); Rohan Bhasin, Santa Clara, CA (US); Nikita Jaipuria, Union City, CA (US); Gautham Sholingar, Sunnyvale, CA (US); Vidya Nariyambut murali, Sunnyvale, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/030,857

(22) Filed: Sep. 24, 2020

(51) Int. Cl.
*G06K 9/40* (2006.01)
*G06K 9/62* (2022.01)
*G06V 20/56* (2022.01)

(52) U.S. Cl.
CPC ......... *G06K 9/6262* (2013.01); *G06K 9/6256* (2013.01); *G06V 20/56* (2022.01)

(58) Field of Classification Search
CPC .. G06K 9/62; G06K 9/00; G06K 9/46; G06K 9/80; G06K 7/14; G06N 20/00; G06N 3/08; G06N 3/04; G06N 7/00; G06N 20/20; G06N 20/10; G06N 5/00; G06N 5/04; G06N 99/00; G06T 5/50; G06T 3/40; G06T 5/00; G06T 7/11; G06T 7/62; G06T 11/00; G06T 7/13; G06T 7/50
See application file for complete search history.

(56) References Cited

U.S. PATENT DOCUMENTS

| | | | |
|---|---|---|---|
| 10,185,880 B2 | 1/2019 | Viswanathan et al. | |
| 10,467,503 B1 | 11/2019 | Kim et al. | |
| 10,532,698 B2 | 1/2020 | Potnis et al. | |
| 2011/0078191 A1* | 3/2011 | Ragnet | G06K 9/00879 707/780 |
| 2019/0080206 A1* | 3/2019 | Hotson | G06K 9/00798 |
| 2019/0122120 A1* | 4/2019 | Wu | G06N 3/0454 |
| 2019/0128989 A1* | 5/2019 | Braun | G01R 33/56509 |
| 2019/0279004 A1* | 9/2019 | Kwon | G06K 9/346 |
| 2020/0074266 A1* | 3/2020 | Peake | G01S 17/931 |
| 2021/0027107 A1* | 1/2021 | Pekelny | G06K 9/6256 |

FOREIGN PATENT DOCUMENTS

WO 2020014286 A1 1/2020

\* cited by examiner

*Primary Examiner* — Quan M Hua
(74) *Attorney, Agent, or Firm* — Frank A. MacKenzie; Bejin Bieneman PLC

(57) ABSTRACT

A system, including a processor and a memory, the memory including instructions to be executed by the processor to train a deep neural network based on a plurality of real-world images, determine the accuracy of the deep neural network is below a threshold based on identifying one or more physical features by the deep neural network, including one or more object types, in the plurality of real-world images and generate a plurality of synthetic images based on the accuracy of the deep neural network is below a threshold based on identifying the one or more physical features using a photo-realistic image rendering software program and a generative adversarial network. The instructions can include further instructions to retrain the deep neural network based on the plurality of real-world images and the plurality of synthetic images and output the retrained deep neural network.

20 Claims, 6 Drawing Sheets

VEHICLE NEURAL NETWORK

BACKGROUND

Vehicles can be equipped with computing devices, networks, sensors and controllers to acquire data regarding the vehicle's environment and to operate the vehicle based on the data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated on a roadway.

DETAILED DESCRIPTION

Figure 1:
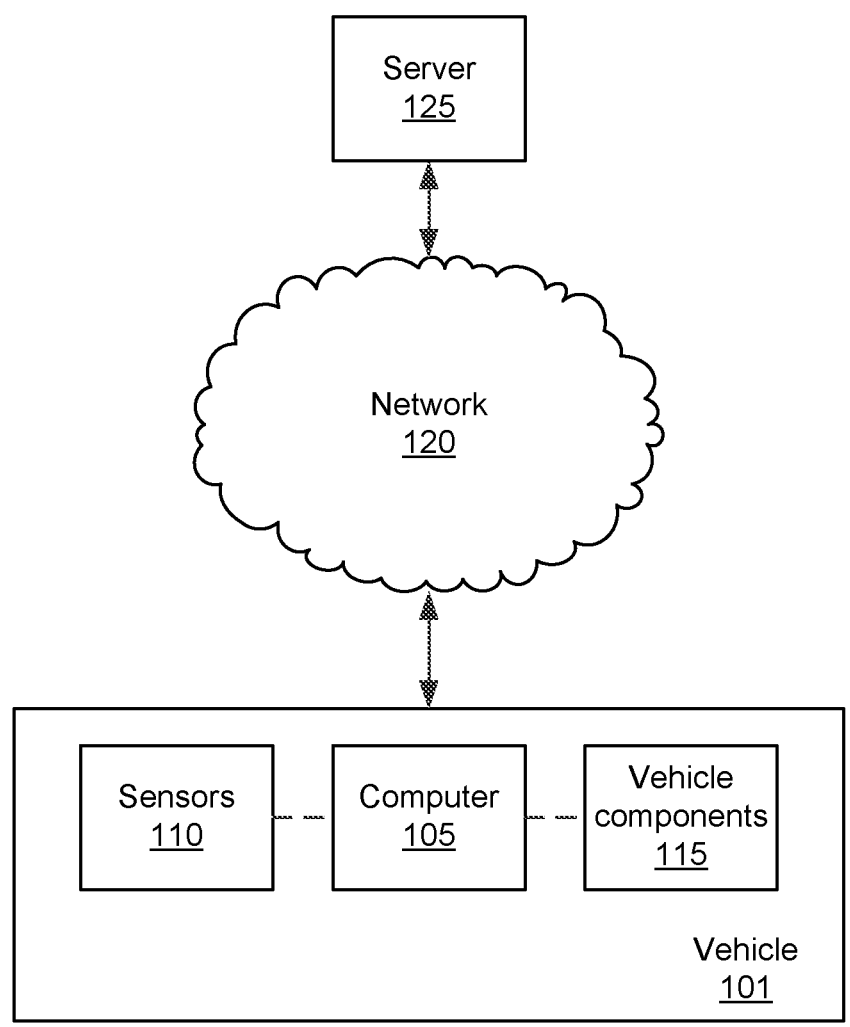
FIG. 1 is a diagram of an example traffic infrastructure system.

A computer in a vehicle can be programmed to acquire data regarding the external environment of a vehicle and to use the data to operate a vehicle in autonomous or semi-autonomous mode. For example, a deep neural network can be trained to determine an angle of a vehicle trailer with respect to a vehicle. The computer can use the angle data to determine a vehicle path that permits the vehicle to back up and park the trailer. A deep neural network can be trained for a plurality of trailer types with input sensor data acquired in a plurality of environmental conditions. Further, a deep neural network can be trained using real-world data supplemented with synthetic data generated using photo-realistic rendering software and generative adversarial networks. The output of the trained deep neural network can be analyzed to determine a distribution of input data types that correspond to a failure to identify the structure of a trailer. A second set of synthetic images can be generated corresponding to the distribution of input data types that correspond to a failure and used to re-train the deep neural network. The re-trained deep neural network can be downloaded to a vehicle and used to operate the vehicle based on determining a trailer angle.

Training deep neural networks can require large training datasets. Image data corresponding to the appearance of trailers and the appearance of environmental conditions, as defined below in relation to FIG. 2, to be encountered in real-world situations should be included in the training image data. Including image data in training datasets that anticipates every possible combination of trailer appearance can require the production of very large, very time-consuming, and very expensive training datasets. Producing very large datasets for training neural networks can require many hours of computing time, and large amounts of input data to be provided. Training datasets require ground truth to accompany the acquired image data. Ground truth is defined as data regarding the contents of an image acquired by means other than the algorithm used to process the image data. For example, ground truth can be data regarding trailer angle as defined below in relation to FIG. 2 obtained by having a human determine the angle either by measuring the trailer in the real world or using photogrammetric tools to measure the trailer angle in the images. Photogrammetric tools are software applications that measure distances and angles in images.

Techniques described herein improve training of deep neural networks by acquiring new image data from real-world situations and processing the new image data to produce a new training dataset to be used to train a deep neural network to determine a trailer angle. In this fashion trailer appearances and environmental conditions not included in an original training dataset can be successfully processed by a deep neural network thereby avoiding the need for very large training datasets. Techniques described herein train neural networks without requiring the collection of real world images included in training datasets that include every possible combination of trailer appearance, trailer angle, and environmental conditions. This reduces the cost, time, and effort required to train a neural network by reducing the number of images required. Techniques discussed herein reduce the time and cost associated with acquiring training datasets including producing the corresponding ground truth.

The methods described herein include training a deep neural network based on plurality of real-world images and determining the accuracy of the deep neural network is below a threshold based on identifying one or more physical features by the deep neural network, including one or more object types, in the plurality of real-world images. A plurality of synthetic images are generated based on determining the accuracy of the deep neural network is below a threshold based on identifying the one or more physical features using a photo-realistic image rendering software program and a generative adversarial network, retraining the deep neural network based on the plurality of real-world images and the plurality of synthetic images and outputting the retrained deep neural network. An accuracy of the retrained deep neural network can be determined based on identifying the one or more physical features, generating, from the photo-realistic image rendering software program and the generative adversarial network, a second plurality of synthetic images based on determining that the accuracy of the deep neural network is below a threshold for the one or more physical features and one or more environmental conditions and retraining the deep neural network based on the plurality of real-world images, the first plurality of synthetic images and the second plurality of synthetic images. the physical features included in the first plurality of synthetic images can be determined from the real-world images. The physical features can include one or more object types including a plurality of types of vehicle trailers, wherein each object type includes at least one or more trailer components or one or more trailer angles with respect to a vehicle. The trailer components can include trailer tongue configuration, trailer side configurations, trailer color and trailer texture.

The physical features can include environmental conditions including weather, lighting, atmospheric, ground type and texture, and background foliage. The physical features corresponding to the plurality of real-world images can be input to the photo-realistic image rendering software program to generate the first plurality of synthetic images. The output from the photo-realistic image rendering software program can be input to the generative adversarial network to generate the second plurality of synthetic images. The physical features, including trailer angle, corresponding to the plurality of real-world images can be used as ground truth to train the deep neural network. The generative adversarial network can include a generative network that generates modified synthetic images and a discriminative network that determines whether the modified synthetic images correspond to real-world images. The generative adversarial network can be trained to generate modified synthetic images that the discriminative network will accept as corresponding to real-world images. The discriminative network can be trained using real-world images. The plurality of real-world images and the first plurality of synthetic images can be divided into a training portion and a testing portion based on distributions corresponding to an occurrence of the physical features in the plurality of real-world images and the plurality of synthetic images. The retrained deep neural network can be output to a vehicle computer comprising a processor and a memory, the memory storing the retrained deep neural network.

Further disclosed is a computer readable medium, storing program instructions for executing some or all of the above method steps. Further disclosed is a computer programmed for executing some or all of the above method steps, including training a deep neural network based on plurality of real-world images and determining the accuracy of the deep neural network is below a threshold based on identifying one or more physical features by the deep neural network, including one or more object types, in the plurality of real-world images. A plurality of synthetic images are generated based on determining the accuracy of the deep neural network is below a threshold based on identifying the one or more physical features using a photo-realistic image rendering software program and a generative adversarial network, retraining the deep neural network based on the plurality of real-world images and the plurality of synthetic images and outputting the retrained deep neural network. An accuracy of the retrained deep neural network can be determined based on identifying the one or more physical features, generating, from the photo-realistic image rendering software program and the generative adversarial network, a second plurality of synthetic images based on determining that the accuracy of the deep neural network is below a threshold for the one or more physical features and one or more environmental conditions and retraining the deep neural network based on the plurality of real-world images, the first plurality of synthetic images and the second plurality of synthetic images. the physical features included in the first plurality of synthetic images can be determined from the real-world images.

The physical features can include one or more object types including a plurality of types of vehicle trailers, wherein each object type includes at least one or more trailer components or one or more trailer angles with respect to a vehicle. The trailer components can include trailer tongue configuration, trailer side configurations, trailer color and trailer texture. The physical features can include environmental conditions including weather, lighting, atmospheric, ground type and texture, and background foliage. The physical features corresponding to the plurality of real-world images can be input to the photo-realistic image rendering software program to generate the first plurality of synthetic images. The output from the photo-realistic image rendering software program can be input to the generative adversarial network to generate the second plurality of synthetic images. The physical features, including trailer angle, corresponding to the plurality of real-world images can be used as ground truth to train the deep neural network. The generative adversarial network can include a generative network that generates modified synthetic images and a discriminative network that determines whether the modified synthetic images correspond to real-world images. The generative adversarial network can be trained to generate modified synthetic images that the discriminative network will accept as corresponding to real-world images. The discriminative network can be trained using real-world images. The plurality of real-world images and the first plurality of synthetic images can be divided into a training portion and a testing portion based on distributions corresponding to an occurrence of the physical features in the plurality of real-world images and the plurality of synthetic images. The retrained deep neural network can be output to a vehicle computer comprising a processor and a memory, the memory storing the retrained deep neural network.

FIG. 1 is a diagram of a traffic infrastructure system 100 that includes a vehicle 101 operable in autonomous ("autonomous" by itself in this disclosure means "fully autonomous"), semi-autonomous, and occupant operated (also referred to as non-autonomous) mode. One or more vehicle 101 computers 105 can receive data regarding the operation of the vehicle 100 from sensors 110. The computer 105 may operate the vehicle 101 in an autonomous mode, a semi-autonomous mode, or a non-autonomous mode.

The computer 105 includes a processor and a memory such as are known. Further, the memory includes one or more forms of computer-readable media, and stores instructions executable by the processor for performing various operations, including as disclosed herein. For example, the computer 105 may include programming to operate one or more of vehicle brakes, propulsion (e.g., control of acceleration in the vehicle 101 by controlling one or more of an internal combustion engine, electric motor, hybrid engine, etc.), steering, climate control, interior and/or exterior lights, etc., as well as to determine whether and when the computer 105, as opposed to a human operator, is to control such operations.

The computer 105 may include or be communicatively coupled to, e.g., via a vehicle communications bus as described further below, more than one computing devices, e.g., controllers or the like included in the vehicle 101 for monitoring and/or controlling various vehicle components 115, e.g., a powertrain controller, a brake controller, a steering controller, etc. The computer 105 is generally arranged for communications on a vehicle communication network, e.g., including a bus in the vehicle 101 such as a controller area network (CAN) or the like; the vehicle 101 network can additionally or alternatively include wired or wireless communication mechanisms such as are known, e.g., Ethernet or other communication protocols.

Via the vehicle network, the computer 105 may transmit messages to various devices in the vehicle and/or receive messages from the various devices, e.g., controllers, actuators, sensors, etc., including sensors 110. Alternatively, or additionally, in cases where the computer 105 actually comprises multiple devices, the vehicle communication network may be used for communications between devices represented as the computer 105 in this disclosure. Further, as mentioned below, various controllers or sensing elements such as sensors 110 may provide data to the computer 105 via the vehicle communication network.

In addition, the computer 105 may be configured for communicating through a vehicle-to-infrastructure (V-to-I) interface with a server 125, e.g., a cloud server or remote server computer, via a network 120, which, as described below, includes hardware, firmware, and software that permits computer 105 to communicate with a server 125 via a network 120 such as wireless Internet (WI-FI®) or cellular networks. Computer 105 may be configured accordingly including processors, memory, transceivers, etc., configured to utilize various wired and/or wireless networking technologies, e.g., cellular, BLUETOOTH® and wired and/or wireless packet networks. Computer 105 may be configured for communicating with other vehicles 101 using vehicle-to-vehicle (V-to-V) networks, e.g., according to Dedicated Short Range Communications (DSRC) and/or the like, e.g., formed on an ad hoc basis among nearby vehicles 101 or formed through infrastructure-based networks via V-to-I communications. The computer 105 also includes nonvolatile memory such as is known. Computer 105 can log data by storing the data in nonvolatile memory for later retrieval and transmittal via a vehicle communication network to a server 125 or a user mobile device. Server computer 125 can also function as a computer 105 included in a roadside infrastructure, or edge, computing node, where an edge computing node is a computer 105 included in or on a stationary infrastructure element such as a pole, a bridge, a wall, building, etc., and that acquires sensor data and communicates with vehicles 101 via a V-to-I interface or the like in a local portion of one or more of a roadway, parking lot or parking structure, etc.

As already mentioned, generally included in instructions stored in the memory and executable by the processor of the computer 105 is programming for operating one or more vehicle 101 components, e.g., braking, steering, propulsion, etc., without intervention of a human operator. Using data received in the computer 105, e.g., the sensor data from the sensors 110, a computer included in the server 125, etc., the computer 105 may make various determinations and/or control various vehicle 101 components and/or operations without a driver to operate the vehicle 101. For example, the computer 105 may include programming to regulate vehicle 101 operational behaviors (i.e., physical manifestations of vehicle 101 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a powertrain controller, a brake controller, and a steering controller. A controller may be an electronic control unit (ECU) such as is known, possibly including additional programming as described herein. The controllers may communicatively be connected to and receive instructions from the computer 105 to actuate the subsystem according to the instructions. For example, the brake controller may receive instructions from the computer 105 to operate the brakes of the vehicle 101.

The one or more controllers for the vehicle 101 may include known electronic control units (ECUs) or the like including, as non-limiting examples, one or more powertrain controllers, one or more brake controllers, and one or more steering controllers. Each of the controllers may include respective processors and memories and one or more actuators. The controllers may be programmed and connected to a vehicle 101 communications bus, such as a controller area network (CAN) bus or local interconnect network (LIN) bus, to receive instructions from the computer 105 and control actuators based on the instructions.

Sensors 110 may include a variety of devices known to provide data via the vehicle communications bus. For example, a radar fixed to a front bumper (not shown) of the vehicle 101 may provide a distance from the vehicle 101 to a next vehicle in front of the vehicle 101, or a global positioning system (GPS) sensor disposed in the vehicle 101 may provide geographical coordinates of the vehicle 101. Vehicle location and orientation data can also be provided by an inertial measurement unit (IMU) sensor. An IMU includes accelerometers configured to record three-dimensional motion of a vehicle 101. The distance(s) provided by the radar and/or other sensors 110 and/or the geographical coordinates provided by the GPS and IMU sensors may be used by the computer 105 to operate the vehicle 101 autonomously or semi-autonomously, for example.

The vehicle 101 is generally a land-based vehicle 101 capable of autonomous and/or semi-autonomous operation and having three or more wheels, e.g., a passenger car, light truck, etc. The vehicle 101 includes one or more sensors 110, the V-to-I interface, the V-to-V interface, the computer 105 and vehicle components 115 including one or more controllers. The sensors 110 may collect data related to the vehicle 101 and the environment in which the vehicle 101 is operating. By way of example, and not limitation, sensors 110 may include, e.g., altimeters, cameras, lidar, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 110 may be used to sense the environment in which the vehicle 101 is operating, e.g., sensors 110 can detect phenomena such as weather conditions (precipitation, external ambient temperature, etc.), the grade of a road, the location of a road (e.g., using road edges, lane markings, etc.), or locations of target objects such as neighboring vehicles 101. The sensors 110 may further be used to collect data including dynamic vehicle 101 data related to operations of the vehicle 101 such as velocity, yaw rate, steering angle, engine speed, brake pressure, oil pressure, the power level applied to vehicle components 115 in the vehicle 101, connectivity between vehicle components 115, and accurate and timely performance of vehicle components 115.

Figure 2:
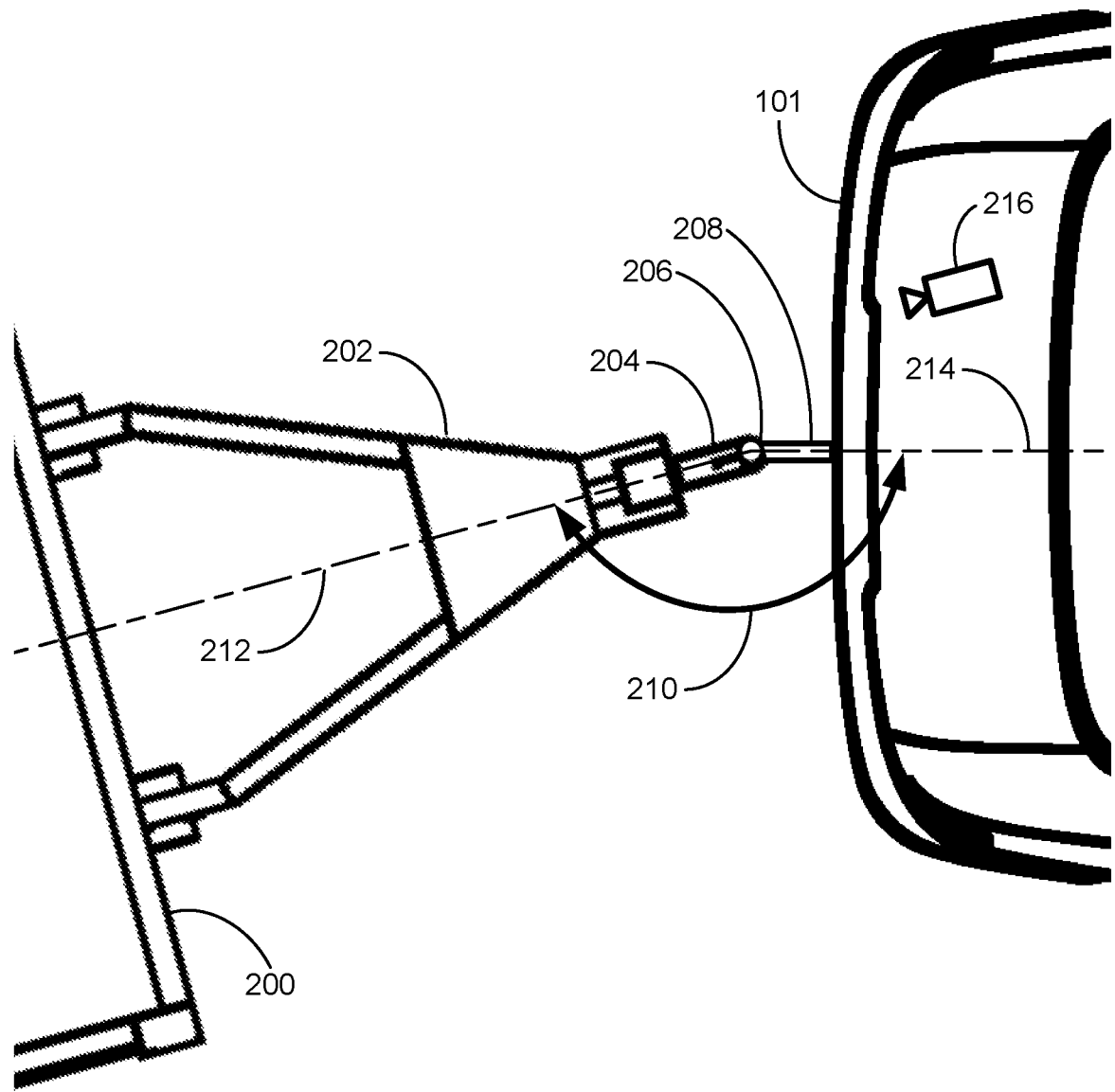
FIG. 2 is a diagram of an example vehicle trailer.

FIG. 2 is a diagram of a trailer 200 attached to a vehicle 101. Vehicles 101 can be equipped to operate in both autonomous and occupant operated mode. By a semi- or fully-autonomous mode, we mean a mode of operation wherein a vehicle 101 can be operated partly or entirely by a computing device as part of a system having sensors and controllers. The vehicle 101 can be occupied or unoccupied, but in either case the vehicle can be partly or completely operated without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous mode, none of these are controlled by a computer.

A trailer 200 is a vehicle (typically without independent propulsion) towable by a vehicle 101. The trailer 200 includes a tongue 202 that includes a trailer coupler 204. The trailer coupler 204 connects the trailer 200 to the vehicle 101 by placing the trailer coupler 204 over a trailer ball 206 to removably connect the trailer coupler 204 to the trailer ball 206. The trailer ball 206 is attached to the vehicle 101 by a ball mount 208. The orientation of a trailer 200 with respect to a vehicle 101 to which it is connected can be described by a trailer angle 210. Trailer angle 210 is defined as the angle that a trailer centerline 212 makes with respect to a vehicle centerline 214. Identifying and locating a trailer 200 can include determining a trailer angle 210 with respect to a towing vehicle 101.

The trailer centerline 212 and vehicle centerline 214 are respectively lines (sometimes referred to as axes) corresponding to horizontal longitudinal centers of a trailer 200 or vehicle 101, respectively, i.e., centerlines 212, 214 are parallel to a ground surface, typically a roadway that supports the trailer 200 and vehicle 101. Accordingly, a trailer centerline 212 is determined by constructing a line through the geometric center of a top-down image of the trailer 200 and a lateral center of the trailer coupler 204, i.e., the trailer centerline 212 runs fore-aft through the trailer 200, presuming that the trailer 200 is or can be treated as substantially rectangular (i.e., a geometric rectangle can be fitted to represent the trailer 200), points of the centerline 212 being determined a lateral center of the trailer 200, i.e., the centerline 212 bisects the trailer 200 in a fore-aft direction. Similarly, a vehicle centerline 214 is determined by constructing a line that passes through the lateral center of a top-down image of the vehicle 101, treating the vehicle 101 as substantially rectangular, the centerline 214 further passing through the trailer ball 206 connected to the vehicle 101. The trailer angle 210 is determined by the angle of the trailer centerline 212 and the vehicle centerline 214; the vertex of the angle 210 is formed by an intersection of the trailer centerline 212 and the vehicle centerline 214 at the center of the trailer ball 206.

The trailer angle 210 of a trailer 200 attached to a vehicle 101 can be determined by a computer 105 in a vehicle 101 to operate the vehicle 101 with an attached trailer 200. A trailer angle 210 can be estimated by processing an image of a trailer 200 and used to operating a vehicle 101 with an attached trailer 200 in reverse, for example. Determining a trailer angle 210 of an attached trailer 200 can permit a computer 105 in a vehicle 101 to determine commands to be sent to vehicle 101 steering components that will cause the vehicle 101 towing the trailer 200 to back the trailer 200 into a selected location, for example a parking spot.

A camera sensor 216, typically a video camera, can be included in a vehicle 101. The camera sensor 216 can be oriented to provide a field of view that includes a view of a trailer 200 including the trailer coupler 204, the ball mount 208 attached to the vehicle 101, and an environment on either side of the trailer 200. In some examples a second camera sensor 216 can be included to acquire images including more of the environment on both sides of the trailer 200 and a third camera sensor 216 can be included to acquire images from the back of the trailer 200. A computer 105 can determine, based on images 300 acquired by the camera sensor 216 of a target location for the trailer 200 such as a location of a parking spot, dock, or ramp, e.g., a location for parking and/or loading or unloading a trailer 200 and a trailer angle corresponding to the location of the trailer with respect to the vehicle 110. A target location can be determined by processing the image 300 with a deep neural network, for example. Based on a determined target location and a determined trailer angle 210, a computer 105 can determine a vehicle path upon which to operate the vehicle 101 that will cause the attached trailer 200 to turn in the appropriate direction at the appropriate rate to position the trailer at the target location. For example, the trailer angle can be used to determine a direction in which to reverse the vehicle 110 to move the trailer to a desired location. As is known, reversing a vehicle 101 with a trailer 200 attached will, when the vehicle is turning, cause the trailer to turn in a direction opposite to the direction in which the vehicle 101 is turning. Because of this the vehicle path determined by computer 105 to move the trailer 200 into the target location can require both forward and reverse motion of the vehicle 101, for example.

For example, computer 105 can determine a target location and orientation for a trailer 200 based on processing an input image acquired by camera sensor 216. The target location can be a parking spot or a ramp, for example. Computer 105 can use a kinematic simulation program or the like to predict motion of a trailer 200 in response to motion of the towing vehicle 101. A kinematic simulation program uses mathematical models of trailers 200 and vehicles 101 to simulate the motion of a trailer 200 in response to applied forces based on a starting trailer angle 210. Computer 105 can determine a vehicle path that applies forces to a trailer 200 to move the trailer 200 into a target location at a target orientation based on the starting trailer angle 210. Computer 105 can transmit commands to vehicle powertrain, vehicle steering and vehicle brakes to operate the vehicle 101 on the vehicle path and thereby apply the determined forces to the trailer 200 and move it to the target location at the target orientation.

Figure 3:
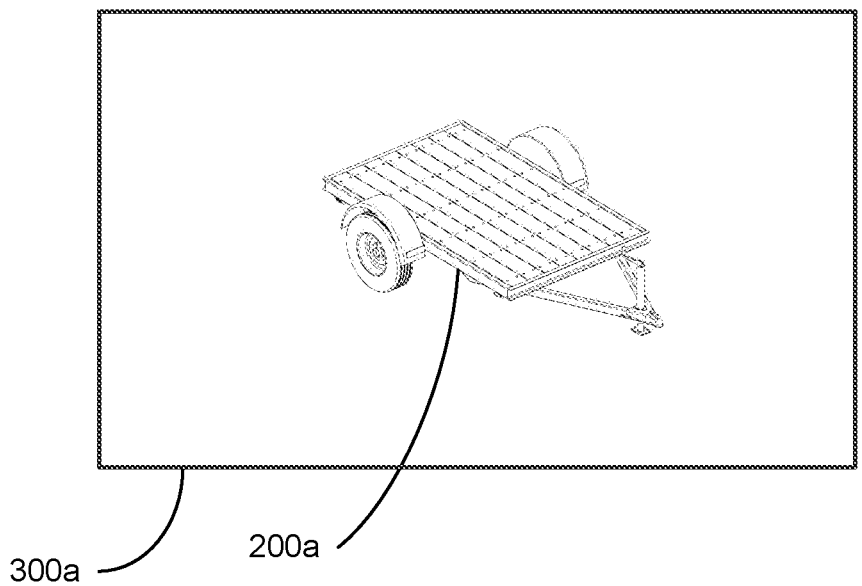
FIG. 3 is a diagram of two example vehicle trailers.
Figure 3:
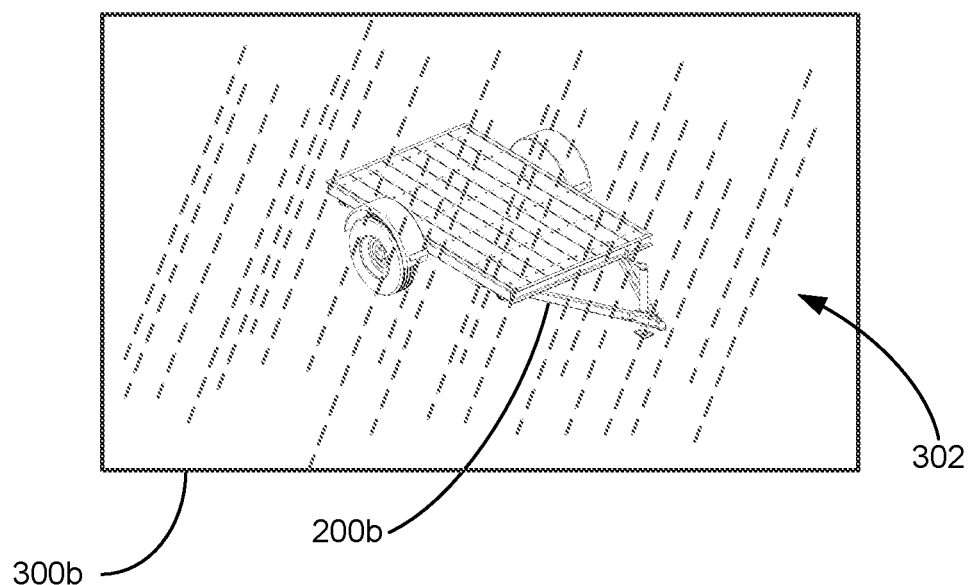

FIG. 3 is a diagram of two video images 300a, 300b (collectively images 300), where each video image 300 is acquired by a camera sensor 216 included in a vehicle 101. Each video image 300 includes a respective image of a trailer 200a, 200b (collectively trailers 200). Trailers 200 can have a plurality of different components configured in a plurality of different configurations. A trailer component herein refers to a conventional trailer component, i.e., a conventional part of a trailer such as a tongue, a bed, a wheel, etc. Trailer 200 components can include attributes (an attribute in this context means a description of a physical feature or characteristic of the trailer) such as trailer tongue types, trailer side types, trailer color and trailer texture. For example, a trailer tongue can be straight, where a single straight bar extends from the trailer bed to the hitch. An A-frame trailer tongue has two bars extending from each side of the trailer bed meeting at the hitch. A trailer can have a flat bed with a side type of no sides or vertically extending sides, i.e., that extend vertically from the edges of the bed. A side type can alternatively or additionally specify a be low or high type, the low type, e.g., extending vertically one or two feet from the trailer bed, or a high type, e.g., extending two or more feet from the trailer bed, for example. Trailer texture refers to a surface topography of trailer surface materials, such as wood or metal, used to construct the trailer bed and sides. Trailer texture can be changed by paint or other coatings applied to the trailer tongue, bed and sides including lettering and designs, etc. A combination of one or more trailer attributes, e.g., trailer side type, trailer texture, and tongue type, is referred to herein as the configuration of the trailer 200. Training a deep neural network to determine trailer angles 210 for a plurality of trailer 200 configurations can include determining a training dataset that includes examples of each trailer 200 configuration.

The appearance of a trailer 200 in a video image 300 can also be affected by environmental conditions. Environmental conditions include lighting, weather, atmospheric conditions, ground type and texture, and background foliage. Lighting includes natural light such as sunlight and artificial light such as streetlights. Sunlight can vary from bright sunlight to none, i.e., night. Sunlight is directional and can create changing patterns of light(s) and shadow(s) depending upon the orientation or pose of a trailer 200, cloud cover, obstructions such as buildings or trees, and the time of day. Weather can include rain, snow, and other forms of precipitation including fog. Video image 300b illustrates the effect of rain (dashed lines) 302 on the appearance of trailer 200b. Atmospheric conditions include dust, haze and smog, all of which can change the appearance of a trailer 200 in a video image 300. Ground type, such as asphalt, concrete, gravel, dirt, or grass and the texture of each type of ground adjacent to the trailer can change the appearance of the trailer in an image. External foliage near a trailer 200 can alter the appearance of a trailer 200 in a video image. For example, tree branches or tall grass can obscure portions of a trailer 200 in a video image.

Differing appearances of trailers 200 can present challenges in determining trailer angles 210 with respect to a vehicle 101. Trailer angles 210 can be determined by processing images 300 with a deep neural network, as will be discussed below in relation to FIG. 4. Determining a trailer angle 210 with a deep neural network based on a real-world image acquired by a camera sensor 216 in a vehicle 101 can depend upon having trained the deep neural network with a training dataset that includes images of trailers 200 with the same components in the same environmental conditions as the trailer 200 in the real-world image. Success in determining a trailer angle 210 is defined as determining a trailer angle 210 within a specified amount, e.g., +/−5 degrees, of a trailer angle 210 that would be obtained by measuring the trailer angle 210 in the real world with physical instruments, for example rulers and protractors. A typical failure in determining a trailer angle 210 includes a deep neural network being unable to determine a trailer angle 210 at all for a given real-world image. Techniques discussed herein improve the ability of a computing device 115 in a vehicle 101 to determine trailer angle 210 in video data by generating training data for a neural network based on acquired data to train the neural network to recognize trailer angles 210 for trailer types in environmental conditions that were not included in the original training data.

Techniques discussed herein can improve the performance of a computer 105 included in vehicle 101 in determining trailer angles 210 by analyzing training data sets to identify distributions of noise characteristics in training images. In examples where analysis of the distributions of noise characteristics identify particular noise characteristics that are underrepresented in the training data set, additional training images can be generated to supply images corresponding to the underrepresented noise characteristics. Noise characteristics are data included in a set of image data that result at least partly from environmental conditions, e.g., weather, such as rain or snow, lighting, such as sunlight direction and atmospheric conditions, etc. Distributions of noise characteristics are determined by plotting a frequency of occurrence of the noise characteristic by type of noise characteristic.

Images can be classified by the apparent noise characteristics present in each image. Apparent noise characteristics included in the images can be classified by humans as they are acquired for inclusion. For example, rain can be classified as light, medium, or heavy. Lighting can be classified as dim, average or bright. An image can be in more than one classification, for example an image can include both dim lighting and light rain. Images can also be classified by processing the images with image processing software that calculates correlations between image regions. Humans can determine a sample of images that include each type of apparent noise characteristic. Acquired real world images can be correlated against regions of the classified sample images. Images that correlate highly (>90% correlation) with respect the classified samples would be likewise classified.

Once the images are classified, whether by human decision or correlation, they can be subjected to statistical measures. Statistical measures including mean and standard deviation can be applied to each noise characteristic distribution. Statistical measures applied to each distribution of noise characteristics can be analyzed to determine whether the plurality of images in a data include an acceptable distribution of noise characteristics. An acceptable distribution of noise characteristics is defined as a distribution that includes low, medium, and high levels of noise in expected proportions based on either human selection or correlation techniques.

The expected proportions can be based on assuming that the noise characteristics are distributed according to a normal or Gaussian distribution. A normal or Gaussian distribution is a probability distribution that assumes that the number of occurrences of a particular noise characteristic is dependent upon the value of the noise characteristic. If the measured value of the noise characteristic is contrast ratio x, the mean of the normal distribution is m and the standard deviation is a, a normal distribution defines the number of occurrences y by the equation:

$$y = \frac{1}{\sigma\sqrt{2\pi}} e^{-\frac{1}{2}\left(\frac{x-\mu}{\sigma}\right)^2} \tag{1}$$

Once the distributions of noise characteristics are determined, images corresponding to contrast ratios that are determined to be underrepresented in the training data set can be generated by photorealistic rendering software and processed using a generative adversarial network to improve the realism of the images. The photorealistic rendering software can produce an image that includes a trailer 200 with specified components at a specified trailer angle 210. The generative adversarial network can process the image to add noise characteristics based on training using real world images as discussed below in the sections regarding training generative adversarial networks. The generated and processed images can be added to the training data set along with ground truth data specifying the trailer angles 210 output from the photorealistic rendering software. The training data set augmented with additional training images corresponding to previously underrepresented noise characteristics can then be used to retrain and retest a deep neural network to identify trailer angles 210 in image data.

The number of images in the training data set can be increased by generating synthetic images that include trailers 200 using photorealistic rendering software. Photorealistic is defined as appearing to an observer as if they were viewing a picture of a real-world scene. Photorealistic rendering software is a software program that can create an image that appears as if it were acquired by a real-world camera viewing a real-world scene. Example photorealistic rendering software is Unreal Engine, produced by Epic Games, Cary, N.C. 27518.

Photorealistic rendering software inputs data describing a scene in mathematical format. For example, a trailer 200 to be rendered can be described as a collection of geometric shapes and surface textures. Each trailer type can have a different collection of geometric shapes and surface textures. A location and orientation of each trailer 200 to be rendered is also specified. The location and orientation of each trailer 200 can be transformed into a trailer angle 210 by specifying a location and field of view of a virtual camera that is used to determine the rendering process. The trailer angle 210 determined by the output data from the photorealistic rendering software is the ground truth data to be used with the output image data to train a deep neural network 400.

Image data output from a photorealistic rendering software program can be input to a generative adversarial network to generate images in the data set of training images corresponding to underrepresented noise characteristics. A generative adversarial network is a neural network that includes a generative network that modifies input images and a discriminator network that is trained to determine whether a modified image is similar to a real image. The generative adversarial network is trained to modify input synthetic images realistically enough to be determined as "real" by the discriminator network.

A generative adversarial network includes two main sections, a generator that can be trained to simulate the effects of different noise characteristics, and a discriminator that can be trained to discriminate "real" from "fake" images. The discriminator is first trained to discriminate "real" from "fake" images by inputting real and synthetic images along with ground truth identifying the source of the images into the discriminator. A real image is an image that has been acquired by a real world camera viewing a real world scene. Synthetic images are generated using photorealistic rendering software as discussed above. The discriminator is trained to output a value corresponding to "real", for example 1.0, when a real image in input and a value corresponding to "fake", for example 0.0, when a synthetic image is input. The generator is then trained to modify an input synthetic image to cause the discriminator to output a "real" value in response to a modified synthetic image. The generator is trained to modify the synthetic image to appear realistic enough that the discriminator determines that the modified synthetic image is a real image.

For example, a generative adversarial network can be trained to modify a synthetic image of a trailer rendered in full sunlight to appear as if it was raining when the photorealistic image was generated. The generative adversarial network can be trained to produce output images with a specified level of noise and the same trailer angle as the input synthetic image. For example, a generative adversarial network can produce an output image with low, medium, or high amounts of rainfall while maintaining the same trailer angle as the input synthetic image.

A deep neural network can be trained and tested by dividing the original real world training data set into two portions. The training data set can be divided based on trailer angles 210 and noise characteristics to ensure that both the training data and the test data include substantially the same number of images corresponding to each trailer angle 210 with each trailer angle 210 having a substantially similar distributions of noise characteristics. The training data set can be analyzed to determine if a type of noise characteristic is "underrepresented". An underrepresented noise characteristic is defined as a distribution of noise characteristics that include fewer examples than expected in real world example. For example, if the original training dataset includes 10% of the images with heavy rain, the training dataset generated by techniques described herein should include at least 10% of the images with heavy rain. In this fashion the techniques described herein can assure that the new training will cover the same environmental conditions that the original training dataset covered. Because images including the underrepresented environmental conditions are being generated by a generative adversarial network images with underrepresented noise characteristics can be generated quickly and easily. Techniques discussed herein can solve the problem of underrepresentation of noise characteristics without requiring additional acquisition of real-world images and corresponding ground truth, thereby avoiding the expense and time involved in acquiring real world training datasets including a plurality of noise characteristics for a particular type of trailer configuration. Generating synthetic data and ground truth with a plurality of noise conditions using photorealistic rendering software and generative adversarial networks can be less expensive and less time consuming than acquiring real world data.

A deep neural network can be trained using the training images as discussed below in relation to FIG. 4 and then tested using the test images, where the ground truth data corresponding to the test images is used to evaluate the performance of the deep neural network. Results from testing the deep neural network can be analyzed with respect to the noise characteristics to determine levels and types of noise characteristics that result in poor performance of the deep neural network. Poor performance is defined as failure to determine the correct trailer angle 210 included in the ground truth. Poor performance can be graded by a difference, e.g., a number of degrees, between the ground truth trailer angle 210 and the trailer angle 210 reported by the deep neural network including failure by the deep neural network to find any trailer angle 210.

Techniques discussed herein can determine error distributions for failure by plotting trailer angle 210 errors as a function of noise. For example, a trained deep neural network can be determined to perform poorly on images that include heavy rainfall and dim lighting. Techniques discussed herein can improve training of deep neural networks by using failure data to generate a second training data set that includes more images that include trailer angles 210 and noise that caused failure in the first training data set. The images are generated using photorealistic rendering software and generative adversarial networks to provide image data and ground truth. The deep neural network can be re-trained using the generated training images and re-tested using a test dataset that includes real world images. This process can be repeated until the deep neural network is trained to provide accurate results on all specified noise characteristics. Accurate results can be defined as determining correct trailer angles to within a specified amount of accuracy, e.g., +/−5 degrees on 90% of the test images. Augmenting test datasets with synthetic data is an independent task from augmenting training datasets with synthetic data. Augmenting test datasets with synthetic data requires additional testing to assure that test results from testing with synthetic data can be properly generalized to real world data.

Figure 4:
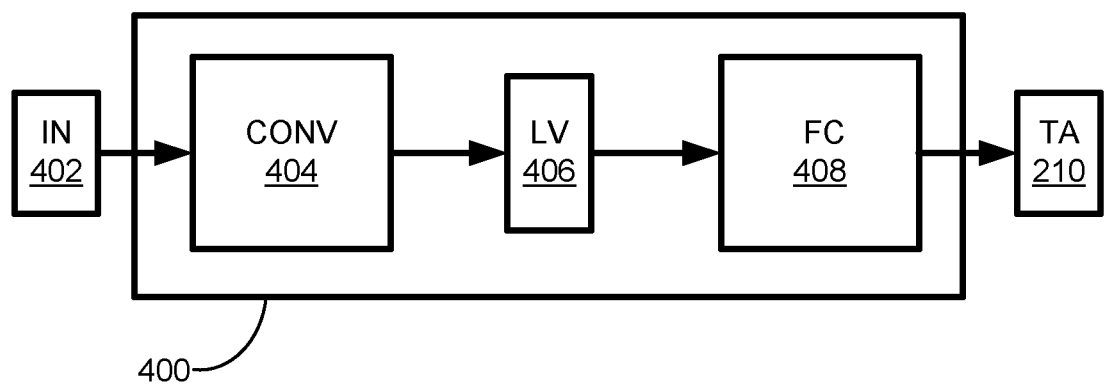
FIG. 4 is a diagram of an example deep neural network.

FIG. 4 is a diagram of a deep neural network 400. Deep neural network 400 can be a software program executing on a management computer including a server 125. Once trained, a deep neural network can be downloaded to a computer 105 included in a vehicle 101. A computer 105 in a vehicle 101 can use a deep neural network to operate a vehicle 101 towing a trailer 200. The computer 105 can use the determined trailer angles 210 to determine a vehicle path for operating the vehicle 101 with an attached trailer 200. For example, a computer 105 can determine a target location and orientation for a trailer 200 based on processing an input image 300. The target location and orientation can be used to determine a direction in which to reverse the vehicle to move the trailer to the target location. The target location can be a parking spot or a ramp, for example, where a ramp is a location for load or unloading a trailer 200. Computer 105 can use a kinematic simulation program or the like to predict motion of a trailer 200 in response to motion of the towing vehicle 101. A kinematic simulation program uses mathematical models of trailers 200 and vehicles 101 to simulate the motion of a trailer 200 in response to applied forces based on a starting trailer angle 210. Computer 105 can determine a vehicle path that applies forces to a trailer 200 to move the trailer 200 into a target location at a target orientation based on the starting trailer angle 210. Computer 105 can transmit commands to vehicle powertrain, vehicle steering and vehicle brakes to operate the vehicle 101 on the vehicle path and thereby apply the determined forces to the trailer 200 and move it to the target location at the target orientation.

Deep neural network 400 can include a plurality of convolutional layers (CONV) 404 that process input images (IN) 402 by convolving the input images 402 using convolution kernels to determine latent variables (LV) 406. Deep neural network 400 includes a plurality of fully-connected layers (FC) 408 that process the latent variables 406 to produce an output trailer angle (TA) 210. Deep neural network 400 can input an image 402 from a camera sensor 216 included in a vehicle 101 that includes an image of an attached trailer 200 to determine a trailer angle 210.

Deep neural network 400 is trained by processing a dataset that includes a large number (>1000) of training images that include a plurality of trailer 200 types at a plurality of trailer angles 210 in a plurality of environmental conditions. Each image in the dataset has corresponding ground truth data that specifies the trailer angle 210 of the trailer 200 in the image. Ground truth data is data regarding an input image 402 that is determined by a process independent from the deep neural network 400. Ground truth data is deemed to represent a measurement of the real world. For example, a ground truth trailer angle 210 can be estimated by manual inspection of the image, i.e., estimating a trailer angle 210 in image data using instruments including rulers and protractors on image hard copies, for example. In other examples, a ground truth trailer angle 210 can be estimated by measuring the trailer angle 210 in the real-world using instruments such a rulers and protractors on the real-world vehicle 101 and trailer 200 being imaged by the camera sensor 216. In training, a trailer angle 210 from processing an input image 402 determined by deep neural network 400 is backpropagated and compared to the ground truth trailer angle 210 corresponding to the input image 402. Backpropagation can compute a loss function based on the trailer angle 210 and corresponding ground truth trailer angle 210. A loss function is a mathematical function that maps a value such as a trailer angle 210 into a real number that corresponds to a cost. In this example the cost can be determined as a difference in degrees between the determined trailer angle 210 and the trailer angle 210 in the corresponding ground truth data. The loss function determines how closely the trailer angle 210 matches the angle in the ground truth data and is used to adjust the parameters or weights that control the deep neural network.

Parameters or weights controlling the deep neural network 400 processing are varied until output trailer angle 210 results match the ground truth for the plurality of images in the training dataset. As will be understood from various applications of image or pattern recognition using deep neural networks 400, parameters or weights include convolution coefficients for the convolution kernels in the convolutional layers 404. Parameters or weights also include parameters or weights that control the linear and/or non-linear functions that process the latent variables 406 to determine the output trailer angle 210. Training a deep neural network 400 typically includes systematically varying these parameters or weights and comparing the output trailer angle 210 to a desired result corresponding to the ground truth trailer angle 210. As a result of varying the parameters over a plurality of trials over a plurality of input images, a set of parameters or weights that achieve a result that matches the ground truth can be determined.

Figure 5:
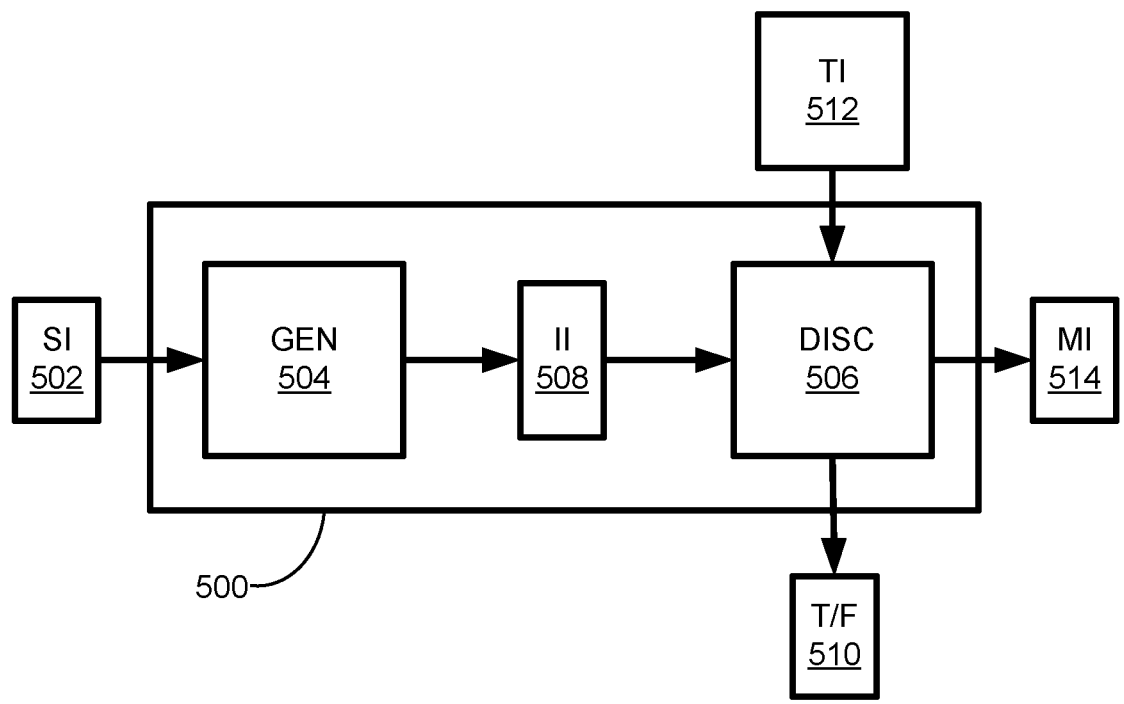
FIG. 5 is a diagram of an example generative adversarial network.

FIG. 5 is a diagram of a generative adversarial network 500. Generative adversarial network 500 includes a generative network (GEN) 502 and a discriminator network (DISC) 506. Generative network 504 is trained to input synthetic images (SI) 502 and process them using convolutional kernels to output intermediate images (II) 508. Generative network 504 add image details corresponding to noise characteristics to the input synthetic images 502. These image details include the appearance of weather such as rain, snow, and fog, and the lighting effects such as sunlight and shadows. Generative network 504 is trained to add realistic amounts of image detail to input images 502 by processing the intermediate images 502 with discriminator network 506.

Discriminator network 506 inputs intermediate images 508 and process the intermediate images 508 to determine whether the intermediate images 508 are indistinguishable from real-world images. If intermediate image 508 are determined to be indistinguishable from real-world images, discriminator network 506 outputs a truth variable (T/F) 510 equal to "TRUE", and outputs the intermediate images 508 as modified images (MI) 514. If the discriminator network 506 determine that the intermediate images 508 are distinguishable from real-world images, discriminator network 506 outputs a truth variable 510 equal to "FALSE" and outputs the intermediate images 508 as modified images 514. Truth variable 510 can be a value between 0.0 and 1.0, where TRUE is defined as any value greater than or equal to 0.5 and FALSE is defined as any value less than 0.5, for example.

Discriminator network 506 is trained to distinguish real-world images from synthetic images by inputting real-world images and synthetic images and corresponding ground truth indicating whether they are real-world or synthetic as training images (TI) 512. By comparing the output truth variable 510 resulting from processing the input training images 512 to the corresponding ground truth data, the discriminator network 506 can be trained to distinguish between real-world and synthetic images. Ground truth data for training images 512 can be determined by observers assigning a value between 0.0 and 1.0 to each training image 512 based on how realistic the observer thinks the training image 512 is. At training time, parameters or weights that program the discriminator network 506 are varied while inputting training images 512. Sets of parameters or weights that cause the discriminator network 506 to consistently output correct truth variables 510 that match the ground truth are saved as parameters or weights that correctly program the discriminator network 506 to accurately distinguish real-world images from synthetic images.

The generative network 504 is trained after training the discriminator network 506. Synthetic images 502 are input to the generative network 504. Parameters or weights that program the convolution kernels within the generative network 506 are systematically varied to produce a plurality of intermediate images 508. The intermediate images 508 are input to discriminator network 506 which distinguishes between real-world and synthetic images. When generative network 506 produce an intermediate image 508 that is accepted by the discriminator network 506 as a real-world image as indicated by discriminator network 506 outputting a truth variable equal to "TRUE", the parameters or weights that produced the intermediate image 508 that fooled the discriminator network 506 is saved as parameters or weights that correctly program the generative network 504.

In operation a trained generative adversarial network 500 inputs a synthetic image 502 and outputs a modified image 514 that corresponds to a real-world image with noise characteristics that match the noise characteristics that the generative adversarial network 500 was trained to reproduce. The generative adversarial network 500 can be trained to produce modified images 514 that include a particular noise characteristic. The generative adversarial network 500 will have a plurality of sets of parameters or weights corresponding to each set of noise characteristics that the generative adversarial network 500 is expected to reproduce. For example, the generative adversarial network 500 can have a set of parameters for each of low, medium, and heavy rainfall at each of morning, noon and evening lighting.

Figure 6:
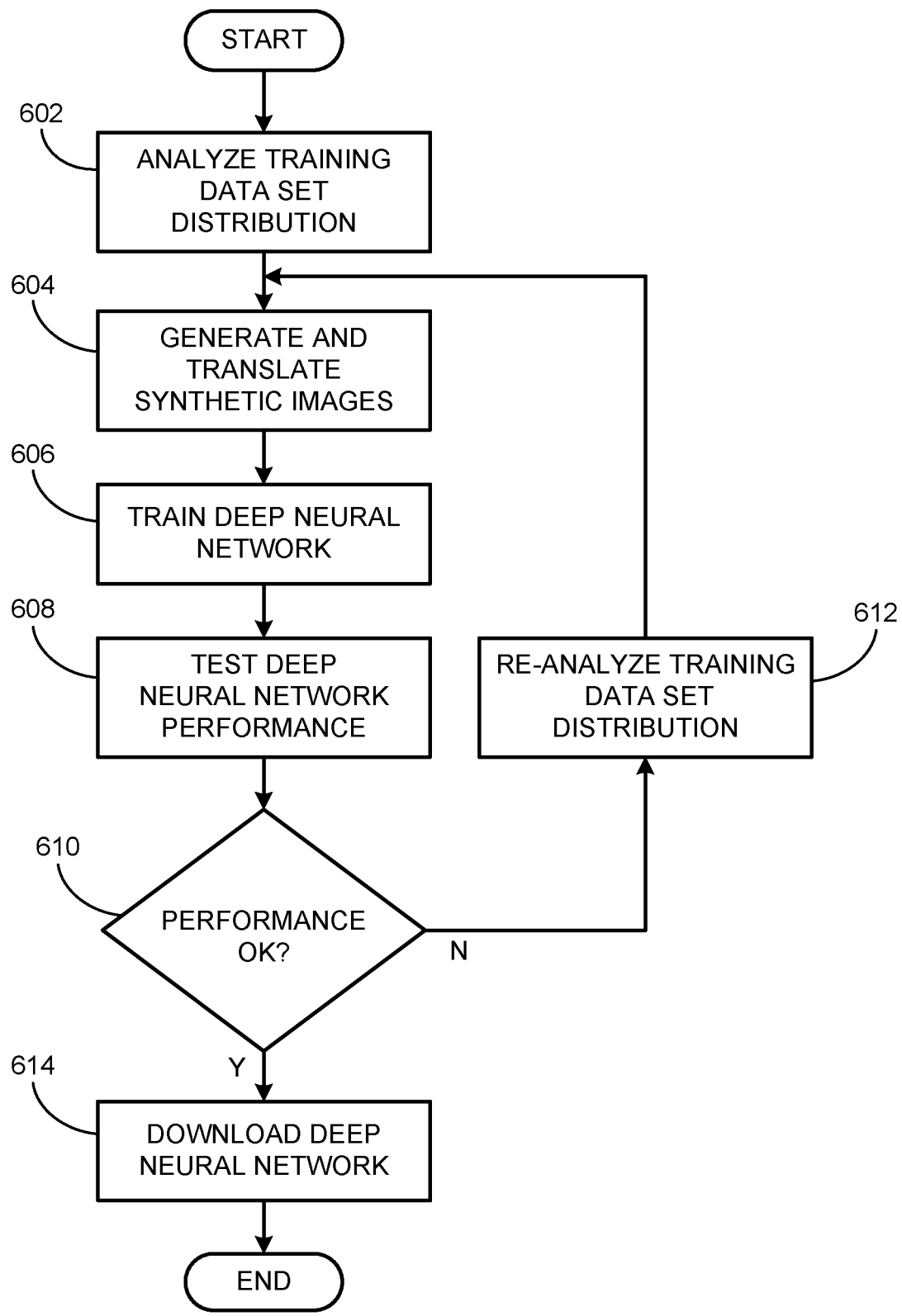
FIG. 6 is a flowchart diagram of an example process to train a deep neural network.

FIG. 6 is a flowchart diagram of a process 600 for training a deep neural network 400 and downloading it to a vehicle 101. Process 600 can be implemented by a processor of a computing device, taking as input information from sensors, and executing commands, and outputting object information, for example. Process 600 includes multiple blocks that can be executed in the illustrated order. Process 600 could alternatively or additionally include fewer blocks or can include the blocks executed in different orders.

Process 600 begins at block 602, where distributions corresponding to a training data set of images is analyzed by a computer such as a management computer in a server 125. The data set of images includes real-world image acquired by a camera sensor 216 included in a vehicle 101 and synthetic images generated by photorealistic rendering software and processed by a generative adversarial network 500 to add realistic noise. The data set of images includes images of a plurality of trailer 200 types being towed by vehicles 101 at a plurality of trailer angles 210 in a plurality of environmental conditions corresponding to a plurality of noise characteristics. The environmental conditions include weather, such as rain and snow, lighting, such as overcast and bright sunlight, and atmospheric, such as smog and dust. Each image is processed using machine vision techniques to classify the noise type and determine a distribution of each type of noise present in the images. For example, an image can be processed to determine an average contrast ratio, where contrast ratio is defined as a ratio of the average value of dark pixels to light pixels. An image can be processed to determine the amount and size of high spatial frequency detail by smoothing the image, subtracting the smoothed image from the original image and summing the difference image. Results of processing the input image to classify the type of noise present can be summarized by determining statistical measure such as mean and standard deviation for distribution of each noise type. The distributions are then analyzed to determine whether each type and level of noise underrepresented in the training data set according to expectations based on normal distributions of noise characteristics.

At block 604 a computer in server 125 can compare the distributions of noise types in the acquired images to distributions of noise types determined for the set of training images in the original training dataset used to train the deep neural network. Based on the comparison of the distributions of noise types in the acquired images to the distributions of noise types in the original training data, the computer can generate synthetic images corresponding to types and levels of noise that are underrepresented in the training data set and processes them with a generative adversarial network 500 to add realistic levels of noise to the synthetic images as discussed above in relation to FIG. 5.

At block 606 a computer in server 125 trains a deep neural network 400 using the training data set including synthetic images corresponding to the underrepresented types and levels of noise to determine trailer angles 210 as discussed above in relation to FIG. 4.

At block 608 a computer in server 125 tests the deep neural network 400 performance using a test data set corresponding to a portion of the training data set. The test data set is determined to include trailer angles 210 and noise characteristics having distributions that match the distributions in the training data set as discussed above in relation to FIG. 3.

At block 610, the performance of the deep neural network 400 is checked by a computer in server 125 to determine whether or not the performance of the deep neural network 400 is OK based on each type of noise characteristic. OK performance is determined by checking to see if the deep neural network 400 determines a trailer angle 210 to within a specified amount, e.g., +/−5 degrees of the ground truth trailer angle 210 for 90% of each type of noise characteristic. If any noise characteristic types are determined to not achieve a correct trailer angle 210, e.g., +/−5 degrees of ground truth for a specified percentage, e.g., 90%, output by deep neural network, the data regarding which noise characteristic types do not achieve the specified percentage, e.g., 90%, correct trailer angles 210 are passed to block 612. When all of the noise characteristic types achieve at least 90% correct trailer angle 210 output, process 600 passes to block 614.

At block 612 the distributions of noise characteristics are re-analyzed by a computer in server 125 to determine which noise types and levels correspond to failures to determine correct trailer angles 210. The computer in server 125 increases the number of images corresponding to these types and levels of noise characteristics in the distributions of noise characteristics and passes the increased distributions back to block 604 to have additional synthetic images corresponding to these noise characteristics generated and processed by generative adversarial networks 500 to add realistic noise corresponding to the increased distributions determined at block 612. The increased numbers of images and corresponding ground truth are used to retrain the deep neural network 400 at block 606, which can be retested at block 608 and rechecked at block 608.

At block 614 the performance of the deep neural network 400 has been determined by a computer in server 125 to find correct trailer angles 210 for 90% of all input images corresponding to all types and levels of noise included in the distributions of noise characteristics. The trained deep neural network 400 can be downloaded to a vehicle 101 and used to operate the vehicle 101 as discussed above in relation to FIG. 2. A computer 105 in a vehicle 101 can use the downloaded deep neural network 400 to determine a trailer angle 210 for a trailer 200 attached to the vehicle 101. The computer 105 can use the determined trailer angle 210 to determine a vehicle path for operating the vehicle that locates an attached trailer 200 in a determined target location as discussed above in relation to FIG. 2. For example, computer 105 can determine a target location and orientation for a trailer 200 based on processing an image acquired by camera sensor 216. The target location can be a parking spot or a ramp, for example. Computer 105 can determine a vehicle path that applies forces to a trailer 200 to move the trailer 200 into a target location at a target orientation based on the starting trailer angle 210. Computer 105 can transmit commands to vehicle powertrain, vehicle steering and vehicle brakes to operate the vehicle 101 on the vehicle path and thereby apply the determined forces to the trailer 200 and move it to the target location at the target orientation. Following block 614 process 600 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Computer 105 can be a computer 105 as described above or may include a dedicated electronic circuit including an ASIC that is manufactured for a particular operation, e.g., an ASIC for processing sensor data and/or communicating the sensor data. In another example, computer 140 may include an FPGA which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in computer 105.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A system, comprising a computing device including:
a processor; and
a memory, the memory including instructions executable by the processor to:
train a deep neural network based on a plurality of real-world images;
determine the accuracy of the deep neural network is below a threshold based on identifying one or more physical features by the deep neural network, including one or more object types, in the plurality of real-world images;
generate a plurality of synthetic images based on determining the accuracy of the deep neural network is below a threshold based on identifying the one or more physical features using a photo-realistic image rendering software program and a generative adversarial network wherein the plurality of synthetic images include noise characteristics including environmental conditions that are underrepresented in the plurality of real-world images;
retrain the deep neural network based on the plurality of real-world images and the plurality of synthetic images; and
output the retrained deep neural network.

2. The system of claim 1, the instructions including further instructions to determine an accuracy of the retrained deep neural network based on identifying the one or more physical features;
generate, from the photo-realistic image rendering software program and the generative adversarial network, a plurality of synthetic images based on determining that the accuracy of the deep neural network is below a threshold for the one or more physical features and one or more environmental conditions; and retrain the deep neural network based on the plurality of real-world images and the plurality of synthetic images.

3. The system of claim 1, wherein the physical features included in the plurality of synthetic images are determined from the real-world images.

4. The system of claim 1, wherein the physical features include one or more object types including a plurality of types of vehicle trailers, wherein each object type includes at least one or more trailer components or one or more trailer angles with respect to a vehicle.

5. The system of claim 4, wherein trailer components include trailer tongue configuration, trailer side configuration, trailer color and trailer texture.

6. The system of claim 1, wherein the physical features include environmental conditions including weather, lighting, atmospheric, ground type and texture, and background foliage.

7. The system of claim 1, wherein the physical features corresponding to the plurality of real-world images are input to the photo-realistic image rendering software program to generate the plurality of synthetic images.

8. The system of claim 1, wherein the output from the photo-realistic image rendering software program is input to the generative adversarial network to generate the plurality of synthetic images.

9. The system of claim 1, wherein the physical features, including trailer angle, corresponding to the plurality of real-world images are used as ground truth to train the deep neural network.

10. The system of claim 1, wherein the generative adversarial network includes a generative network that generates modified synthetic images and a discriminative network that determines whether the modified synthetic images correspond to real-world images.

11. The system of claim 10, wherein the generative network is trained to generate modified synthetic images that the discriminative network will accept as corresponding to real-world images.

12. The system of claim 11, wherein the discriminative network is trained using real-world images.

13. The system of claim 1, the instructions including further instructions to divide the plurality of real-world images and the first plurality of synthetic images into a training portion and a testing portion based on distributions corresponding to an occurrence of the physical features in the plurality of real-world images and the plurality of synthetic images.

14. The system of claim 1, wherein the retrained deep neural network is output to a vehicle computer comprising a processor and a memory, the memory storing the retrained deep neural network.

15. The system of claim 14, further comprising a vehicle computer memory storing instructions to input images to the retrained deep neural network to determine a vehicle path upon which to operate.

16. A method, comprising:
    training a deep neural network based on a plurality of real-world images;
    determining the accuracy of the deep neural network is below a threshold based on identifying one or more physical features by the deep neural network, including one or more object types, in the plurality of real-world images;
    generating a plurality of synthetic images based on the accuracy of the deep neural network is below a threshold based on identifying the one or more physical features using a photo-realistic image rendering software program and a generative adversarial network wherein the plurality of synthetic images include noise characteristics including environmental conditions that are underrepresented in the plurality of real-world images;
    retraining the deep neural network based on the plurality of real-world images and the plurality of synthetic images; and
    outputting the retrained deep neural network.

17. The method of claim 16, further comprising determining an accuracy of the retrained deep neural network based on identifying the one or more physical features;
    generating, from the photo-realistic image rendering software program and the generative adversarial network, a plurality of synthetic images based on determining that the accuracy of the deep neural network is below a threshold for the one or more physical features and one or more environmental conditions; and
    retraining the deep neural network based on the plurality of real-world images and the plurality of synthetic images.

18. The method of claim 16, wherein the physical features included in the plurality of synthetic images are determined from the real-world images.

19. The method of claim 16, wherein the physical features include one or more object types including a plurality of types of vehicle trailers, wherein each object type includes at least one or more trailer components or one or more trailer angles with respect to a vehicle.

20. The method of claim 19, wherein trailer components include trailer tongue configuration, trailer side configuration, trailer color and trailer texture.

* * * * *